United States Patent [19]

Fukunaga et al.

[11] Patent Number: 4,530,050
[45] Date of Patent: Jul. 16, 1985

[54] CENTRAL PROCESSING UNIT FOR EXECUTING INSTRUCTIONS OF VARIABLE LENGTH HAVING END INFORMATION FOR OPERAND SPECIFIERS

[75] Inventors: Yasushi Fukunaga, Hitachi; Tadaaki Bandoh, Tohkai; Kotaro Hirasawa; Hidekazu Matsumoto, both of Hitachi; Jushi Ide, Mito; Takeshi Katoh, Hitachi; Hiroaki Nakanishi, Hitachi; Tetsuya Kawakami, Hitachi; Ryosei Hiraoka, Hitachi, all of Japan

[73] Assignees: Hitachi, Ltd.; Hitachi Engineering Co., Ltd., both of Tokyo, Japan

[21] Appl. No.: 408,924

[22] Filed: Aug. 17, 1982

[30] Foreign Application Priority Data

Aug. 26, 1981 [JP] Japan ............................ 56-132716
Aug. 26, 1981 [JP] Japan ............................ 56-132717

[51] Int. Cl.³ .............................................. G06F 9/36
[52] U.S. Cl. ................................................ 364/200
[58] Field of Search ... 364/200 MS File, 900 MS File

[56] References Cited

U.S. PATENT DOCUMENTS

| 3,344,404 | 9/1967 | Curewitz | 364/200 |
| 3,377,620 | 4/1968 | Sims, Jr. | 364/200 |
| 4,109,310 | 8/1978 | England et al. | 364/200 |
| 4,236,206 | 11/1980 | Strecker et al. | 364/200 |
| 4,241,397 | 12/1980 | Strecker et al. | 364/200 |
| 4,241,399 | 12/1980 | Strecker et al. | 364/200 |

OTHER PUBLICATIONS

"B1700 COBOL/RPG-S Language", Pub. No. 1058823-015, Copyright 1973, Burroughs Corporation, pp. 156-175.
"VAX-11 Architecture Handbook", Digital Equipment Corp., Copyright 1979, pp. 79-117.
"A Guide to the IBM System/370 Model 168", pp. 26-29.

Primary Examiner—James D. Thomas
Assistant Examiner—William G. Niessen
Attorney, Agent, or Firm—Antonelli, Terry & Wands

[57] ABSTRACT

A central processing unit for executing instructions of variable length in which an operand specifier for specifying the addressing mode of an operand is independent of an operation code for ascertaining the kind of an operation and the number of operands. Each operand specifier is formed of one or more data bytes, and has a stop bit flag indicating whether or not the particular operand specifier is the last operand specifier. By adding the stop bit flag, the operand specifier can be shared, and different processing can be executed with an identical operation code. In a case where, when operation code decoding means has provided an output indicative of the last operand, the stop bit flat is not detected in the corresponding operand specifier, the corresponding instruction is detected as an error.

4 Claims, 11 Drawing Figures

| NO | FORMAT | OPERAND |
|---|---|---|
| 1 | S 000 Rn | Rn |
| 2 | S 001 Rn | (Rn) |
| 3 | S 010 Rn DISP$_8$ | (Rn + DISP$_8$) |
| 4 | S 011 Rn DISP$_8$ | ((Rn + DISP$_8$)) |
| 5 | S 100 Rn DISP$_{16}$ | (Rn + DISP$_{16}$) |
| 6 | S 101 Rn DISP$_{16}$ | ((Rn + DISP$_{16}$)) |
| 7 | S 111 0110 – Rn DISP$_{32}$ | (Rn + DISP$_{32}$) |
| 8 | S 111 0111 – Rn DISP$_{32}$ | ((Rn + DISP$_{32}$)) |
| 9 | S 111 0000 IM$_8$ | IM$_8$ |
| 10 | S 111 0001 IM$_{16}$ | IM$_{16}$ |
| 11 | S 111 0010 IM$_{32}$ | IM$_{32}$ |
| 12 | S 111 1010 DISP$_8$ | (PC + DISP$_8$) |
| 13 | S 111 1011 DISP$_8$ | ((PC + DISP$_8$)) |
| 14 | S 111 1100 DISP$_{16}$ | (PC + DISP$_{16}$) |
| 15 | S 111 1101 DISP$_{16}$ | ((PC + DISP$_{16}$)) |
| 16 | S 111 1110 DISP$_{32}$ | (PC + DISP$_{32}$) |
| 17 | S 111 1111 DISP$_{32}$ | ((PC + DISP$_{32}$)) |
| 18 | S 110 0001 Rx Rn | (Rn + Rx·L) |
| 19 | S 110 0010 Rx Rn DISP$_8$ | (Rn + DISP$_8$ + Rx·L) |
| 20 | S 110 0011 Rx Rn DISP$_8$ | ((Rn + DISP$_8$) + Rx·L) |
| 21 | S 110 0100 Rx Rn DISP$_{16}$ | (Rn + DISP$_{16}$ + Rx·L) |
| 22 | S 110 0101 Rx Rn DISP$_{16}$ | ((Rn + DISP$_{16}$) + Rx·L) |
| 23 | S 110 0110 Rx Rn DISP$_{32}$ | (Rn + DISP$_{32}$ + Rx·L) |
| 24 | S 110 0111 Rx Rn DISP$_{32}$ | ((Rn + DISP$_{32}$) + Rx·L) |

1 BYTE  1 BYTE  1 BYTE  1 BYTE  1 BYTE  1 BYTE

CENTRAL PROCESSING UNIT FOR EXECUTING INSTRUCTIONS OF VARIABLE LENGTH HAVING END INFORMATION FOR OPERAND SPECIFIERS

BACKGROUND OF THE INVENTION

The present invention relates to a central processing unit for executing instructions of variable length in which an operand specifier for specifying the addressing mode of an operand is independent of an operation code for ascertaining the kind of processing of an operation and the number of operands.

In general, in a variable-length instruction scheme, even in case of an identical operation code, instructions have various lengths. Moreover, although the head field of each instruction is always on operation code, the other parts have various significances. Therefore, the significances of fields in instructions are not uniquely determined.

In addition, an operand specifier included in an instruction has its length varied in correspondence with an addressing mode. Therefore, even in case of an identical operation code, the lengths of instructions taken various values.

As instruction schemes having operand specifiers of variable lengths, two typical known examples will be mentioned below.

One of them is instruction formats at the time when Burroughs Corporation's Computer B1700 is used as a COBOL/PRG-oriented architecture. This is described in "B700 COBOL/RPG-S-Language, 1058823-015, Copyright 1973, Burroughs Corporation".

The other example is the instruction scheme having operand specifiers to become variable in length, which the architecture of DEC (Digital Equipment Corporation)'s Computer VAX11/780 possesses. This is described in "VAX11 Architecture Handbook, Copyright 1979" and U.S. Pat. No. 4,236,206.

The two conventional instruction schemes mentioned here have the feature that parts for specifying the format of an operand and an addressing mode are prescribed by an operand specifier of variable length and are independent of an operation code.

With the conventional variable-length instructions, however, the number of operands to be processed and operand specifiers for specifying the addressing modes of the operands to be processed are held in correspondence at 1-to-1. For example, to the two processing (operations) of:

A + B→B

A + B→C two operation codes need to be allotted.

That is, in the processing of A + B→B, it needs to be especially prescribed by the operation code to process the two operands and to use the second operand twice.

If, the processing of A + B→B, the number of operands is three and three operand specifiers are provided, the distinction between A + B→B and A + B→C is of no concern, but for two operand specifiers, quite identical operand specifiers need to be provided in the processing of A + B→B. Unfavorably, this lowers the packaging efficiency of a memory drastically when the operand specifier itself assumes plural bytes (in general, a long one assumes 7 bytes).

Originally, distinguishing the processing of A + B→B and A + B→C by the use of the operation codes has been done in order to raise the packaging efficiency of a memory. That is, in the instruction of A + B→B, the operation code is used to define that the number of operands is two and that the second operand specifier is used twice, whereby the two operand specifiers are made sufficient.

Although the example of A + B→B has been referred to, the processing of A − B→B is similar, and the above applies to all examples in which A and B are operated, whereupon the result is stored in B. In general, they are expressed as A(op)B→B. In this manner, with the conventional variable-length instructions, the processing which uses the same operand a plurality of times needs to be distinguished from another processing of the same function by the operation code, and the number of processing which can be specified by the operation code is limited.

In addition, in the scheme in which the number of operand specifiers is ascertained by an operation code, the detection of errors in instructions has been difficult because the relationship between the number of operands and that of the operand specifiers cannot be checked.

SUMMARY OF THE INVENTION

The principal object of the present invention is to provide a central processing unit for executing instructions of variable length that permit operand specifiers to be shared without distinguishing them by the use of operation codes.

Another object of the present invention is to provide a central processing unit which enhances error detectibility for instructions of variable length that permit a plurality of operands to share operand specifiers.

According to the principal feature of the present invention, end information (hereinbelow, termed "end flags") of operand specifiers are added to specific fields of the operand specifiers for specifying the addressing modes of operands; only the last operand specifier has the end flag set at "1"; and when operand specifier means has detected said end flag set at "1", the particular operand specifier is judged to be the last forming one instruction, whereupon the instruction is executed. As will be concretely described later, in a case where the operand specifier decode means has detected the set of the end flage (indicating that the particular operand specifier is the last) before operation code decode means provides an information on the last operand, the operand corresponding to the particular operand specifier is used again. In this case, the last operand specifier is repeatedly used until the number of operands ascertained by the operation code is reached.

As another feature of the present invention, the error of an instruction is detected on the basis of the content of the end flag and the number of operands ascertained by the operation code. Concretely, in a case where the operand specifier decode means does not detect the set of the end flag when the operation code decode means has provided the information on the last operand, the particular instruction is detected as an error.

BRIEF DESCRIPTION OF THE DRAWINGS

Other objects and features of the present invention will become apparent from the appended claims, in the light of the following description taken in conjunction with the drawing in which:

DETAILED DESCRIPTION OF A PREFERRED EMBODIMENT

Figure 1:
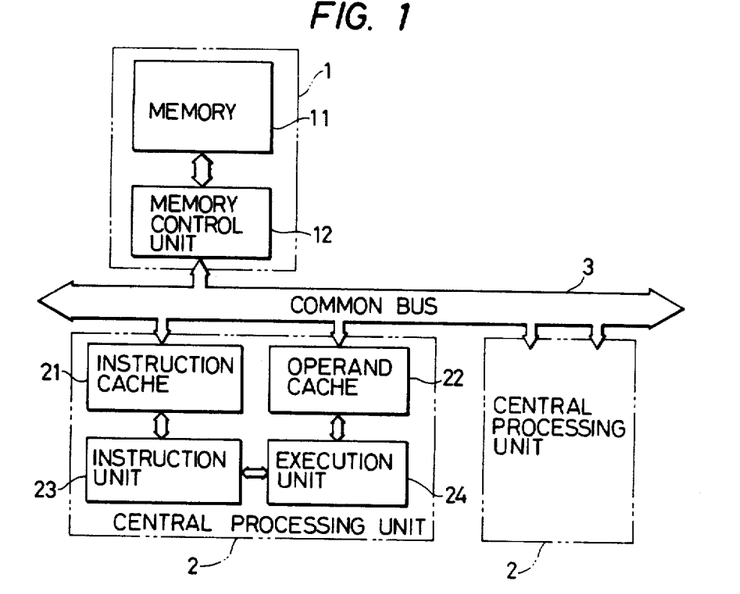
FIG. 1 is a fundamental conceptual diagram of a data processing system to which the present invention is applied.

In FIG. 1, a memory unit 1 and a plurality of central processing units 2 are connected by a common bus 3, through which information can be exchanged therebetween.

The memory unit 1 is constructed of a memory 11 which stores instructions and operands to be handled by the instructions, and a memory control unit 12 which controls the reading and writing of the instructions and operands. The memory 11 and the memory control unit 12 are connected by a memory bus.

Since the memory unit 1 is not directly pertinent to the subject matter of the present invention and its construction and operations are well known, the detailed explanation of this part is omitted.

The central processing units 2 can be connected to the common bus 3 in a plural number (in the illustration, two), and they access instructions and operands from the memory unit 1 so as to process the instructions in succession, respectively.

Here is illustrated an example whereinm, in order to process instructions at high speed, instructions and operands once read out are respectively copied in an instruction cache 21 (fast buffer memory) and an operand cache 22 (fast buffer memory), and an I unit 23 which fetches and decodes instructions and calculates operand addresses, and an E unit which fetches operands and executes instructions perform pipeline processing, respectively.

The usage of such instruction cache or operand cache, or the pipeline processing of the I unit and E unit has been known in itself.

Figure 2A:
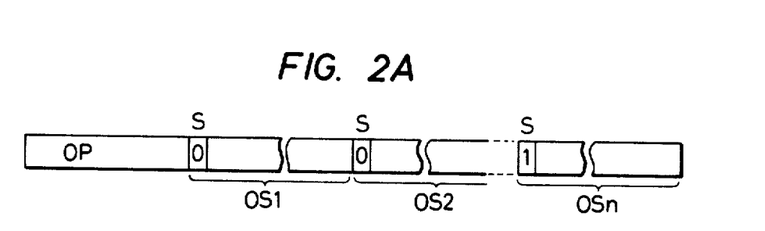
FIGS. 2(A) and 2(B) are diagrams showing examples of the format of a variable-length instruction and the format of an operand specifier for use in the present invention.

Now, FIG. 2(A) shows an example of the format of an variable-length instruction which the central processing unit 2 handles.

One instruction is constructed of one operation code (usually called "ope-code") OP, and one or more operand specifiers $OS_1$, $OS_2$ . . . and $OS_n$ each of which includes an end flag S.

The operation code OP indicates the content of processing (the sort of processing) of the particular instruction, the number of operands necessary for the processing, and the properties (data length, distinction between read/write, data type: fixed point/floating point . . . , etc.) of the operands. It is composed of one to several bytes.

As described before, the operand specifier specifies the addressing mode of an operand, and whether or not the particular operand specifier is the last one. The length of the operand specifier is one to several bytes, and it varies depending upon the addressing mode and is independent of the content of the operation code.

The operand specifiers are arrayed in the order of operands to be used in the corresponding instruction, and only the last operand specifier has the end flag S set at "1". In a case where the number of the operand specifiers decoded in one instruction is smaller than the operand number indicated by the operation code OP, the operand corresponding to the last operand specifier is repeatedly used.

While the repeated use of the same operand is realized by various methods, the most desirable method will be the repeated use of the last operand specifier. This point will be stated in detail later.

There will now be explained an example in which the operand number specified by the operation code OP and the number of operand specifiers disagree. In a case where the operation code OP indicates, e.g., the processing of addition, the function is generally expressed by:

$$A + B \rightarrow C$$

If $A \neq B \neq C$, it requires three operand specifiers. However, when a plurality of identical operands are used as in case of $A = B = C$ or $A \neq B = C$, an identical operand specifier can be used a plurality of times. Therefore, the number of operands ascertained by the operation code and the number of operand specifiers do not always agree.

For example, in the case of $A = B = C$, that is, in the processing of:

$$A + A \rightarrow A$$

the identical operand specifier is used three times, whereby one operand specifier suffices.

In the case of $A \neq B = C$, that is, in the processing of:

$$A + B \rightarrow B$$

the second operand specifier is used twice, whereby the two operand specifiers suffice.

In this manner, even in the addition processing of the same operation code which ascertains the operand number of three, the different processing can be executed in accordance with the operand specifier numbers of one, two and three.

Figure 2B:
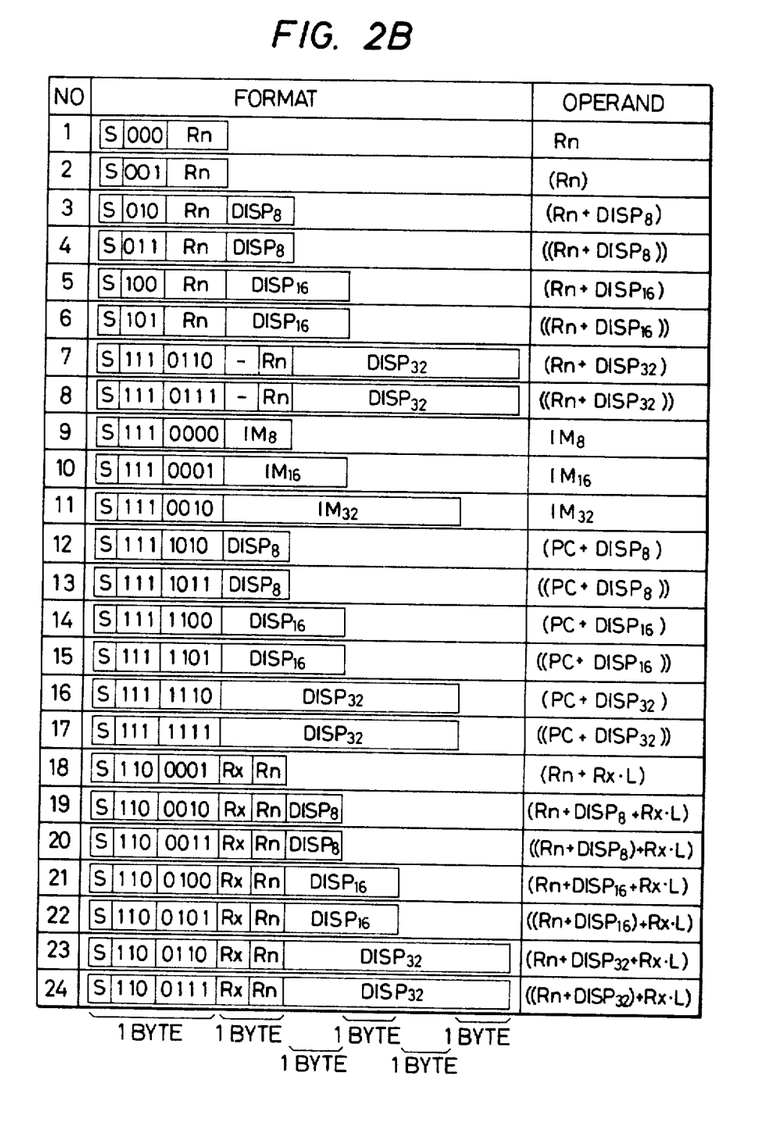

Concrete examples of operand specifiers are shown in FIG. 2(B).

Here, Examples No. 1–No. 24 are listed, and the formats thereof and the corresponding operands are indicated in 1-to-1 correspondence.

In FIG. 2(B), the ( ) of the operand designates the content of that address of a memory which is indicated by a value within ( ).

In the format, DISP designates a displacement and IM 'immediate' (data direct), and a suffix denotes the size thereof in terms of the number of bits.

Further, $R_x$ designates an index register and $R_n$ a general register, and L denotes the size of the operand in byte.

The relations between the formats and operands in FIG. 2(B) will be understood to some extent, but they will be briefly explained below.

No. 1 is register direct addressing, in which the content of the general register, indicated by $R_n$, itself becomes an operand directly.

All of No. 2 and the following examples are operand specifiers which use the contents of a memory as operands, the addresses of the memory being calculated in forms indicated in the column of operands.

No. 2 is indirect addressing, in which the content of the general register indicated by $R_n$ becomes the address of an operand.

In each of Nos. 3, 5 and 7, a value indicated by DISP is added to the content of the general registor indicated by $R_n$, and the sum becomes the address of an operand.

In Nos. 4, 6 and 8, the memory contents of the addresses obtained in Nos. 3, 5 and 7 become the addresses of operands, respectively.

Nos. 9-11 are immediate data, in which the values of $IM_8$, $IM_{16}$ and $IM_{32}$ become operands in themselves.

Nos. 12-17 differ from Nos. 3-8 in only the fact that a program counter PC is used instead of the general register $R_n$. The PC holds an address next an operand specifier to be decoded.

Nos. 18-24 are such that the values of the index register $R_x$ are further added to Nos. 3-8. In this case, the values of the index register $R_x$ are multiplied by the data lengths L of operands ($R_x \cdot L$).

This is a processing required for permitting the value of the index register $R_x$ to be set as a displacement from the head irrespective of the data length L.

That is, the multiplication by L (indicating the data length) allows the index register $R_x$ to store a value indicating No. of data as reckoned from the head, irrespective of the data length.

For example, when "0" is stored in the index register $R_x$, it is the tenth data as reckoned from the head, and as the address thereof, 10 is the automatically added (L=1) when the data is a byte, 20 (L=2) when it is a word, or 40 (L=4) when it is a long word, whereby the user can set the value of the index register $R_x$ irrespective of the data length.

Figure 3:
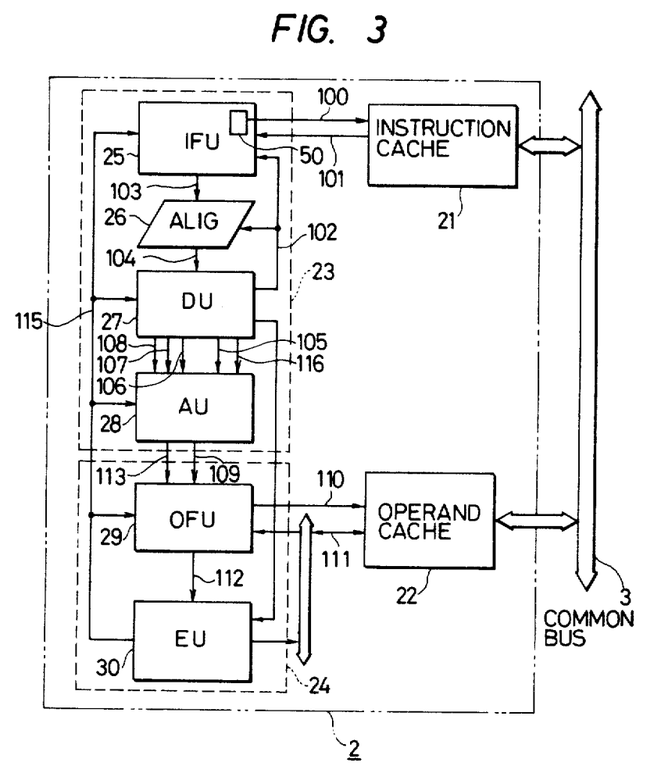
FIG. 3 is a block diagram of a concrete embodiment in the case where the present invention is applied to a central processing unit in FIG. 1.

FIG. 3 is a more concrete block diagram of the central processing unit 2 in FIG. 1.

In FIG. 3, the parts of an instruction fetch unit (IFU) 25, an aligner (ALIG) 26, a decode unit (DU) 27 and an address calculating unit (AU) 28 correspond to the I unit 23 in FIG. 1, and an operand fetch unit (OFU) 29 and an execute unit (EU) 30 correspond to the E unit 24. The arrangement of FIG. 1 has been described to the effect that the I unit 23 and the E unit 24 perform the pipeline processing. In the example shown in FIG. 3, the respective units are further divided into the instruction fetch unit IFU 25, decode unit DU 27 and address calculating unit AU 28 and into the operand fetch unit OFU 29 and execute unit 30, which perform pipeline processing respectively.

Since, however, the subject matter of the present invention is not directly pertinent to such pipeline processing themselves, detailed description on the pipeline processing is omitted.

In FIG. 3, the instruction fetch unit 25 has a program counter 50 for fetching an instruction in advance, which counter performs the processing of reading out previously the instruction to be subsequently executed, from the instruction cache 21.

An address desired to be read out is sent to the instruction cache 21 via an address line 100, and the corresponding instruction of 4 bytes is transmitted to the instruction fetch unit IFU 25 via a data line 101.

In a case where the corresponding instruction does not exist in the instruction cache 21, the particular instruction is read out from the memory 1 through the common bus 3 and is stored in the instruction cache 21. The operations of the cache are well known, and are described in, e.g., "A Guide to the IBM System/370 Model 168".

When the instruction of 4 bytes has been transmitted to the instruction fetch unit 25, the program counter 50 is increased by plus 4 (+4) and supplies the instruction cache 21 with a request for transmitting the next instruction.

This operation is continued until a buffer (not shown) disposed within the instruction fetch unit IFU 25 is filled up.

The instruction read out in advance is transmitted from the instruction fetch unit IFU 25 to the aligner ALIG) 26 through a bus 103.

The aligner 26 transmits the particular instruction to a bus 104 after shifting it by the number of bytes instructed on a signal line 102 from the decode unit DU 27. Although the aligner ALIG 26 is shown here as being distinguished from the instruction fetch unit IFU 25, the former may well be considered as being included in the latter.

Figure 5A:
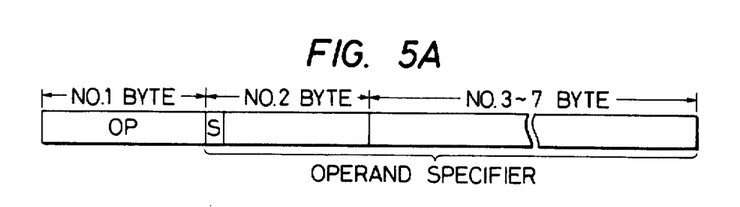
FIGS. 5A and 5B show the formats of operand specifiers for use in the explanation of FIG. 4.
Figure 5B:
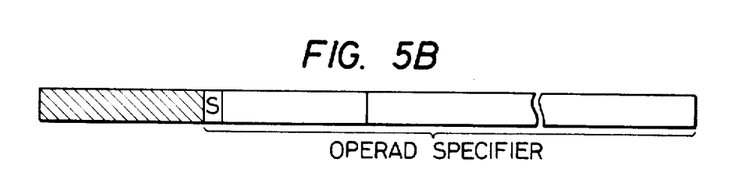

By properly operating the value on the signal line 102, the bus 104 is suppled with the instruction so that, as illustrated in FIG. 5A, when the first operand specifier of the instruction is to be processed, the operation code OP may be located at the left end and followed by the first operand specifier, while when the second or subsequent operand specifier is to be processed, the operand specifier may be arranged with a dummy of 1 byte preceding, as seen in FIG. 5B. The above control will be described in detail later.

The decode unit (DU) 27 decodes the operation code and the operand specifiers transmitted from the aligner 26 (ALIG), and sends the following information to the address calculating unit AU 28:

(1) An addressing mode is sent through a bus 105.

As explained before, there are the following addressing modes (a)-(h), one of which is specified:

(a) Register direct-No. 1
(b) $R_n$-No. 2
(c) $R_n$+DISP type-Nos. 3, 5 and 7
(d) $R_n$+DISP indirect type-Nos. 4, 6 and 8
(e) Immediate-Nos. 9, 10 and 11
(f) PC+DISP type-Nos. 12, 14 and 16
(g) PC+DISP indirect type-Nos. 13, 15 and 17
(h) With indexes in (b)-(d)-Nos. 18-24

No. 1-No. 24 correspond to those of the operand specifier formats shown in FIG. 2(B).

(2) The DISP or immediate data is sent in 32 bits through a bus 106.

(3) The address of the general register $R_n$ is sent through a bus 107.

(4) The address of the index register $R_x$ is sent through a bus 108, and (5) the value of the program counter to be used for the address calculation is sent through a bus 116.

In accordance with the addressing mode indicated by the bus 105 and at any mode other than (a) and (e), the address calculating unit AU 28 calculates the address of an operand and delivers the calculated address to a bus 109.

On the other hand, in case of (a), the content of the bus 107 is delivered to a bus 113 as it is, and in case of (e), the content of the bus 106 is delivered to the bus 109.

In any mode other than (a) and (e), the operand fetch unit OFU 29 supplies a bus 110 with the content of the bus 109 indicative of the sent address. When the operand is "read", the unit 29 requests the operand cache 22 to perform a read processing.

When a read operand has been delivered from the operand cache 22 to a bus 111, the operand fetch unit OFU 29 delivers the read operand to the execute unit 30 through a bus 112 and indicates that the operands are ready.

When the operand is "write", the operand fetch unit OFU 29 continues to deliver the address of the bus 110 until write data from the execute unit EU 30 is delivered to the bus 111.

On the other hand, as regards the mode (a), the operand fetch unit OFU 29 accesses the general register (not shown) of its own on the basis of the register address 113 transmitted from the address calculating unit AU 28. Only one difference from the other mode than (a) is whether the memory or the register is accessed.

Regarding (e), the unit 29 supplies the bus 111 with the content of the bus 109 as it is and informs the execute unit EU 30 to the effect that the operands are ready.

In addition, the execute unit EU 30 receives the head address of a microprogram transmitted through an operation code bus 114 from the decode unit DU 27, and it successively processes the instruction by employing the operands of the bus 112 in case of a "read" operand and by delivering the operands (data) to the bus 111 in case of a "write" operand.

Further, in a case where the instruction is a branch instruction, a new program counter value is set in the program counter 50 of the instruction fetch unit IFU 25 or in a DP register 69 within the decode unit DU 27 to be stated later, and simultaneously, the processed results in the respective units on the operands precedently processed by the pipeline processing are cancelled, by the use of a bus 115.

The above is the outline of the processing for one operand specifier, and the respective units (25–30) perform the processing of the operand specifier in succession and in parallel by the pipeline processing.

Now, as to the decode unit 27 concerning the subject matter of the present invention, a concrete example will be mentioned and described in detail.

Figure 4:
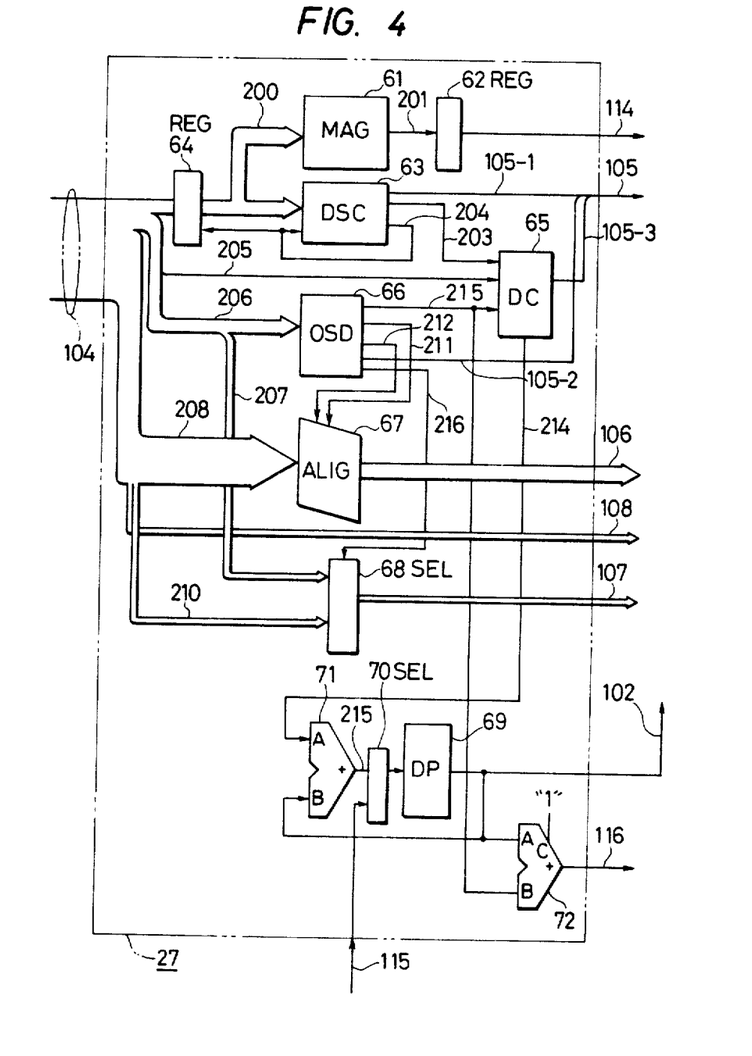
FIG. 4 is a block diagram of a concrete embodiment of a decode unit in FIG. 3 as forms the essential portion of the present invention.

FIG. 4 is a block diagram showing the concrete embodiment of the decode unit DU depicted in FIG. 3.

The DP register 60 indicates the head of the instruction to be decoded by the decode unit DU 27. In decoding the first operand specifier, it indicates the address of the operation code, and in decoding the second or subsequent operand specifier, it indicates the address of (the head of the particular operand specifier)−1.

The above address is transmitted to the aligner ALIG 26 and instruction fetch unit IFU 25 shown in FIG. 3, through the bus 102. The bus 104 is simultaneously supplied from the aligner ALIG 26 with plural bytes or data corresponding to the above address. As seen from FIG. 5A, the first byte of the bus 104 is supplied with the operation code OP as shown (A) in case of reading out the first operand specifier, or with dummy data as shown in FIG. 5B in case of reading out the second or subsequent operand specifier. The second byte is supplied with the operand specifier including the end flag S, and the third to seventh bytes are supplied with the other information of the particular operand specifier.

A bus 204 affords an information indicating which operand is being processed. When the information indicates the end of the processing of all the operands, the first byte of the bus 104 is set in an operation code register 64.

An output from the operation code register 64 is sent to a microprogram address generator (MAG) 61 which finds the head address of the microprogram of the corresponding instruction in the execute unit 30, and a decode sequence controller (DSC) 63 which provides information for the operands of the corresponding instruction.

The output result 201 of the MAG 61 is set in a head address register 62, and it is delivered to the execute unit EU 30 through the operation code bus 114 in synchronism with the delivery of the first operand from the operand fetch unit OFU 29 to the execute unit EU 30.

Figure 6:
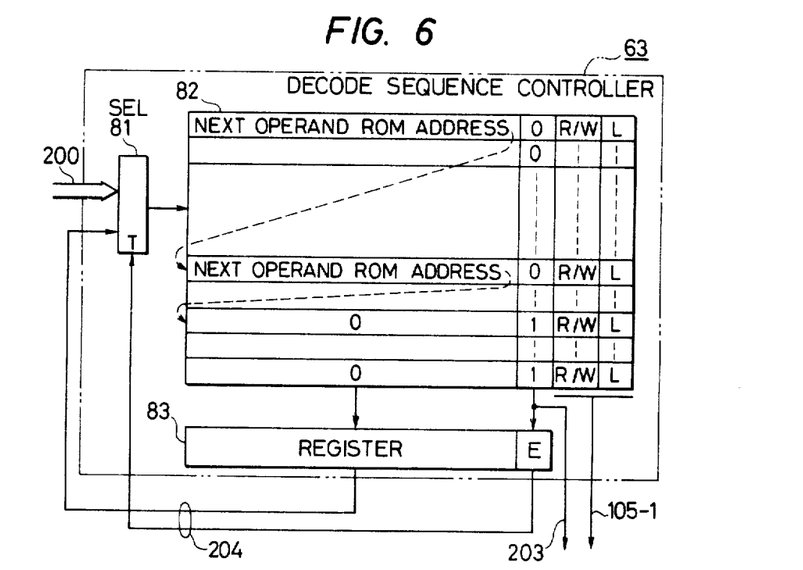
FIG. 6 is a block diagram of an embodiment of a decode sequence controller (63) in FIG. 4.

The DSC 63 has, for example, an arrangement shown in FIG. 6. Information as shown in FIG. 6 is set in a ROM 82 beforehand, and is read out by employing the operation code and the information indicative of the processing of Nos. of the operands as addresses.

More specifically, when the first byte has been set in the operation code register 64, the side of a bus 200 is selected by a selector SEL 81, and information on the first operand is read out with the operation code as an address.

The information read out includes:
(1) the properties of the operand, namely, an information R/W of read operand or write operand and an information indicating the data length L (byte, word, long word) of the operand,
(2) a flag E indicating the end of the operand, and
(3) an address in which the information of the next operand of the same instruction is stored.

The information (1) is delivered to a bus 105-1 and transmitted to the address calculating unit AU 28, and the information (2) is delivered to a bus 203 and transmitted to decoder controller (DEC) 65.

The information of Items (2) and (3) is latched in a register 83, and are used as the address for reading out the information on the next operand. Upon receiving the information E of Item (2) at its select terminal T, the selector 81 selects the side of the bus 200 (the side of the operation code register 64) when the information E is "1", and the side of the bus 204 (the next operand information address) when the information is "0".

Accordingly, when the information E is "0", information on the operand is successively read out from the ROM 82.

On the other hand, that signal line 205 within the bus 104 which indicates the end flag S is connected to the decode controller 65.

Here, since the end flag S is indicated by one bit, it merely passes through an operand specifier decoder 66. However, in a case where the end information S itself is added to the operand specifier as one code signal, this signal is detected by the operand specifier decoder 66 so as to check if the particular operand specifier is the last operand specifier.

In addition, the head 7 bits of the operand specifier are sent to the operand specifier decoder 66 by a bus 206.

The operand specifier is decoded by the information of 7 bits, and an example of the decoding will be explained with reference to FIG. 7.

Figure 7A:
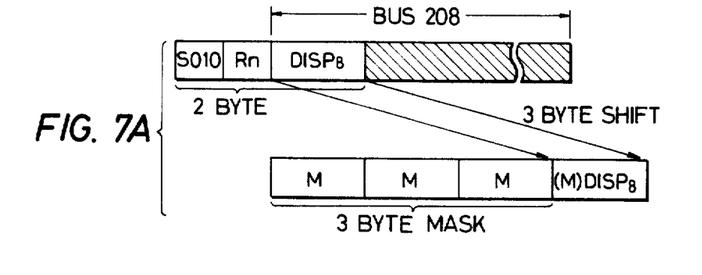
FIGS. 7A and 7B are diagrams for use in the explanation of the operations of an operand specifier decoder (66)

When, by way of example, the operand specifier ($R_n + DISP_8$) indicated at No. 3 in FIG. 2(B) has been sent, it is detected that 3 bits in the upper 7 bits are 010 as shown in FIG. 7(A), whereby the following five information can be provided:

(1) The operand specifier has a length of 2 bytes.
(2) In a case where the content of a bus 208 is delivered to the bus 106, the right shift of 3 bytes is necessary for adjusting the digit of the DISP.
(3) In order to render the DISP value 4 bytes, the upper 3 bytes shall be provided by code-expanding the most significant bit (M) of the $DISP_8$.
(4) With $R_n + DISP_8$, the address of the operand can be calculated.
(5) The information of $R_n$ exists in the lower 4 bits of the first byte.

Figure 7B:
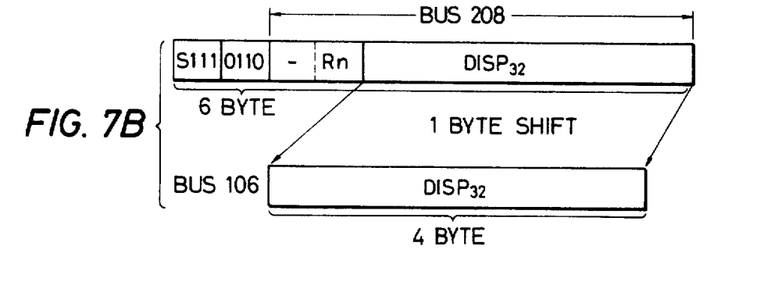

Likewise, when ($R_n + DISP_{32}$) at No. 7 in FIG. 2(B) has been sent, it is detected that the upper 7 bits except the end flag bit S are 1110110 as shown in FIG. 7(B), whereby the following five information can be provided:

(1) The operand specifier has a length of 6 bytes.
(2) In a case where the content of the bus 208 is delivered to the bus 106, the left shift of 1 byte is necessary for adjusting the digit of the DISP.
(3) Since the DISP has all 32 bits specified, it must be provided as it is.
(4) With $R_n + DISP_{32}$, the address of the operand can be calculated.
(5) The information of $R_n$ exists in the lower 4 bits of the second byte of the operand specifier.

While the two examples have been mentioned above, they are summed up as follows:

The operand specifier decoder 66 decodes the operand specifier sent in, and provides respective information mentioned below.

(1) A bus 215 is supplied with the length of the operand specifier. By way of example, when the operand specifier ($R_n + DISP_8$) which is the operand specifier No. 3 in FIG. 2(B) has been sent in, "2" is provided.
(2) A bus 211 is supplied with the number of shift bytes for an aligner 67 for displacement (DISP)/immediate (IM) data.

For example, in case of the operand specifier ($R_n + DISP_8$), the right shift of 3 bytes is instructed as shown in FIG. 7(A), and in case of ($R_n + DISP_{32}$), the left shift of 1 byte as shown in FIG. 7(B).

(3) A bus 212 is supplied with instruction data of mask bytes for the aligner 67.

That is, in the data of 4 bytes which are delivered to the bus 106 for the aligner 67, the mask of the upper 2 or 3 bytes is instructed, whereby the DISP or IM information of 1 byte or 2 bytes can be rendered 4 bytes by the code expansion.

For example, the $DISP_8$ is shifted by 3 bytes as shown in FIG. 7(A), and the $DISP_{32}$ is shifted leftward by 1 byte because it is preceded by one surplus byte of "—$R_n$", as shown in FIG. 7(B).

The reason is that, unless the upper 3 bytes of the $DISP_8$ have therein the code bits of the $DISP_8$ as expanded, the normal address calculation of 32 bits cannot be performed. (The bus 212 serves for the specification thereof.)

(4) A bus 105-2 is supplied with an addressing mode, by which the operating mode of the address calculating unit AU 28 is instructed.

Regarding the addressing modes, the presence of the 8 modes (a)-(h) has already been explained in connection with the description of the address calculating unit AU 28 in FIG. 3.

(5) A bus 216 is supplied with an information indicating whether the position in which the general register $R_n$ exists is the first byte or the second byte.

The first byte is indicated for the ($R_n + DISP_8$), and the second byte for the ($R_n + DISP_{32}$).

On the other hand, the bus 108 is supplied with the part of the index register $R_x$ in the operand specifier.

Depending upon the position where the general register $R_n$ exists, indicated by the signal 216 (the signal indicative of the first byte or the second byte), the selector 68 supplies the bus 107 with a part corresponding to the $R_n$ (the content of a bus 207 or the content of a bus 210).

Since the aligner 57 is given the second to seventh bytes of the operand specifier by the bus 208 as stated before, it performs the shift processing by the shift number given by the signal line 211 and also performs the code expansion for the mask part given by the signal line 212, thereby to deliver the data of 4 bytes to the bus 106.

These are as shown in FIGS. 7(A) and 7(B).

Now, the decode controller 65 will be described.

This portion is also the essential part in the case of handling the variable-length instruction (with the S bit added) according to the present invention.

As stated previously, the decode controller 65 has the three input signal lines of the signal line 203 indicating the operand end flag E, the signal line 205 indicating the end flag S of the operand specifier, and the signal line 215 indicating the byte number ($OS_B$) of the operand specifier. It delivers the added value $DPINC_B$ of the DP 69 to a signal line 214 in byte unit. The algorithm in this case is as follows:

If E=1,
$DPINC_B = OS_B$
Otherwise, at S=0,
$DPINC_B = OS_B - 1$ and at S=1,
$DPINC_B = 0$ That is,
(1) In a case where the end flag E of the operand is "1", all the operands of the corresponding instruction have been obtained, and hence, in order to point at the head of the next instruction, the output is delivered to the signal line 214 so that the content of the DP register 69 may have the byte number ($OS_B$) of the operand specifier added thereto.
(2) In a case other than (1), namely, in a case where E=0 and where the end flag S is not set yet, the output is delivered to the signal line 214 so that the value of (the number of bytes of the operand specifier: $OS_B$)−1 may be added, in order to deliver the next operand specifier to the bus 104 with the dummy of 1 byte located at the head byte.
(3) In a case other than (1), namely, in a case where E=0 and where the end flag S is set, "0" is provided so that the DP register 69 may hold its value intact. Thus, the same operand specifier is used for the processing of the next operand and is used repeatedly.

Figure 8:
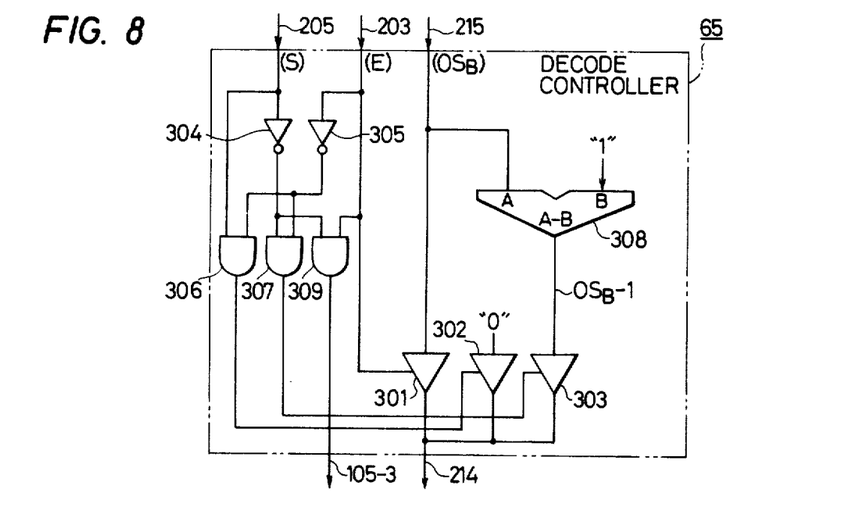
FIG. 8 is a circuit diagram of an embodiment of a decode controller (65).

FIG. 8 shows a hardware arrangement which realizes the algorithm in the decode controller 65.

In the case of E=1, an output gate 301 is enabled to deliver the content $OS_B$ of the bus 215 to the bus 214, while in the case of E=0, at S=0, a gate 307 turns "on" and an output gate 303 is enabled to deliver $OS_B-1$, and at S=1, a gate 306 turns "on" and an output gate 302 is enabled to deliver "0".

Unless the S bit is 1 when E is 1, it is meant that operand specifiers larger in number than operands exist. In FIG. 8, an AND gate 309 turns "on" to provide an error signal 105-3 and to communicate the occurrence of the error to the address calculating unit AU 28.

The address calculating unit AU 28 communicates the error signal 105-3 to the ensuing unit (operand fetch unit OFU 29), and the occurrence of the error is finally communicated to the execute unit EU 30.

In FIG. 8, numerals 304 and 305 designate inverters, numerals 306, 307 and 309 AND gates, and numeral 308 a subtractor for ($OS_8-1$).

An adder 71 adds the current value of the DP register 69 and that of the signal line 214 and sets the sum in the DP register 69 through a selector 70. Thus, the address of the next operand specifier is supplied to the bus 102. In this way, the aligner ALIG 26 can deliver the next operand specifier to the bus 104 in the format shown in FIGS. 5(A) or (B).

On the other hand, the content of the bus 115 is selected by the selector 70 and set in the DP register 69, whereby the change of the content of the DP register 69 in the foregoing branch instruction is also permitted.

An adder 72 adds the value ($OS_B$) of the signal line 215 indicating the length of the corresponding operand specifier, to the value of the DP register 69 and further adds a carry unit "1", thereby to supply the bus 116 with an address next the operand specifier being decoded.

The address calculating unit AU 28 utilizes the content of the bus 116 as the value of the program counter PC for the address calculation.

In this manner, according to the present invention, there is the feature that the operation code and the operand specifier are independent and that the length of the operand specifier can be arbitrarily set. In addition, using one operation code, both the instructions of the A (OP) B→C type and the instructions of the A (OP) B→B type can be expressed with the optimum amounts of information of the respective instructions, so that the number of instructions which can be specified by the operation codes of equal lengths increases.

That is, in a case where operation code lengths are equal, a larger number of high function instructions can be added in accordance with the present invention.

Moreover, the error detection rate can be enhanced by performing the reasonable check of the number of operands and the number of operand specifiers.

While, in the foregoing embodiment, the end flag S is added to the most significant bit of the operand specifier, the position need not always be restricted to this part, but the end flag may be provided in any place of the operand specifier.

In the foregoing embodiment, utilizing the same operand repeatedly a plurality of times is realized by repeatedly decoding the same operand specifier without renewing the content of the DP register 69. Alternatively, a special signal may be sent from the decode unit to the execute unit EU 30 so as to instruct the repeated utilization of the operand previously obtained.

We claim:

1. A central processing unit for executing instructions of variable length in which an operand specifier for specifying the addressing mode of an operand is independent of an operation code for ascertaining the kind of operation and the number of operands, comprising:
   (A) instruction fetch means for fetching an instruction from memory means storing instructions and operands;
   (B) decoding means connected to said instruction fetch means and for decoding an operation code and an operand specifier;
   (C) address calculating means connected to said decoding means and for calculating an address of an operand on the basis of the decoded result of the operand specifier from said decoding means;
   (D) operand fetch means connected to said address calculating means and for fetching the operand from said memory means on the basis of the calculated address; and
   (E) executing means connected to said operand fetch means as well as said decoding means and for executing the instruction successively by the use of the operands from said operand fetch means and in accordance with the decoded results of the operation codes from said decoding means,
   said decoding means including:
   (i) operation code decoding means for decoding the operation codes of the instruction and delivering information on the operands in the operand specifiers,
   (ii) operand specifier decoding means for decoding information added to specific fields of the respective operand specifiers on deciding whether or not the particular operand specifier is the last operand specifier, and
   (iii) means for causing the operand specifier to be used again, when the information indicative of the last operand specifier has been received from said operand specifier decoding means and the information indicative of the last operand is not received from said operation code decoding means.

2. A central processing unit according to claim 1, wherein said decoding means further includes error detection means connected to the operation code decoding means and the operand specifier decoding means for detecting the instruction as an error in a case where the information indicative of the last operand has been received from said operation code decoding means and said operand specifier decoding means does not receive the information indicative of the last operand specifier.

3. A central processing unit according to claim 1, wherein said decoding means includes means for supplying said instruction fetch means with a signal for obtaining the operand specifier to be decoded next, each time the decoding of one operand specifier ends.

4. A central processing unit according to claim 1, wherein the instruction is formed of an operation code of one to plural bytes and an operand specifier of one to plural bytes, and said operand specifier decoding means includes means for decoding the first byte of each operand specifier and delivering the information on whether or not the particular operand specifier is the last operand specifier.

* * * * *